(No Model.)  3 Sheets—Sheet 1.

W. H. HALL.
HORSE RAKE.

No. 333,218. Patented Dec. 29, 1885.

Attest,
Leonard Vassall.
Arthur LeBoutillier.

Inventor,
William H. Hall
By Parkinson & Parkinson
His Attorneys (No Model.) 3 Sheets—Sheet 2.
W. H. HALL.
HORSE RAKE.
No. 333,218. Patented Dec. 29, 1885.
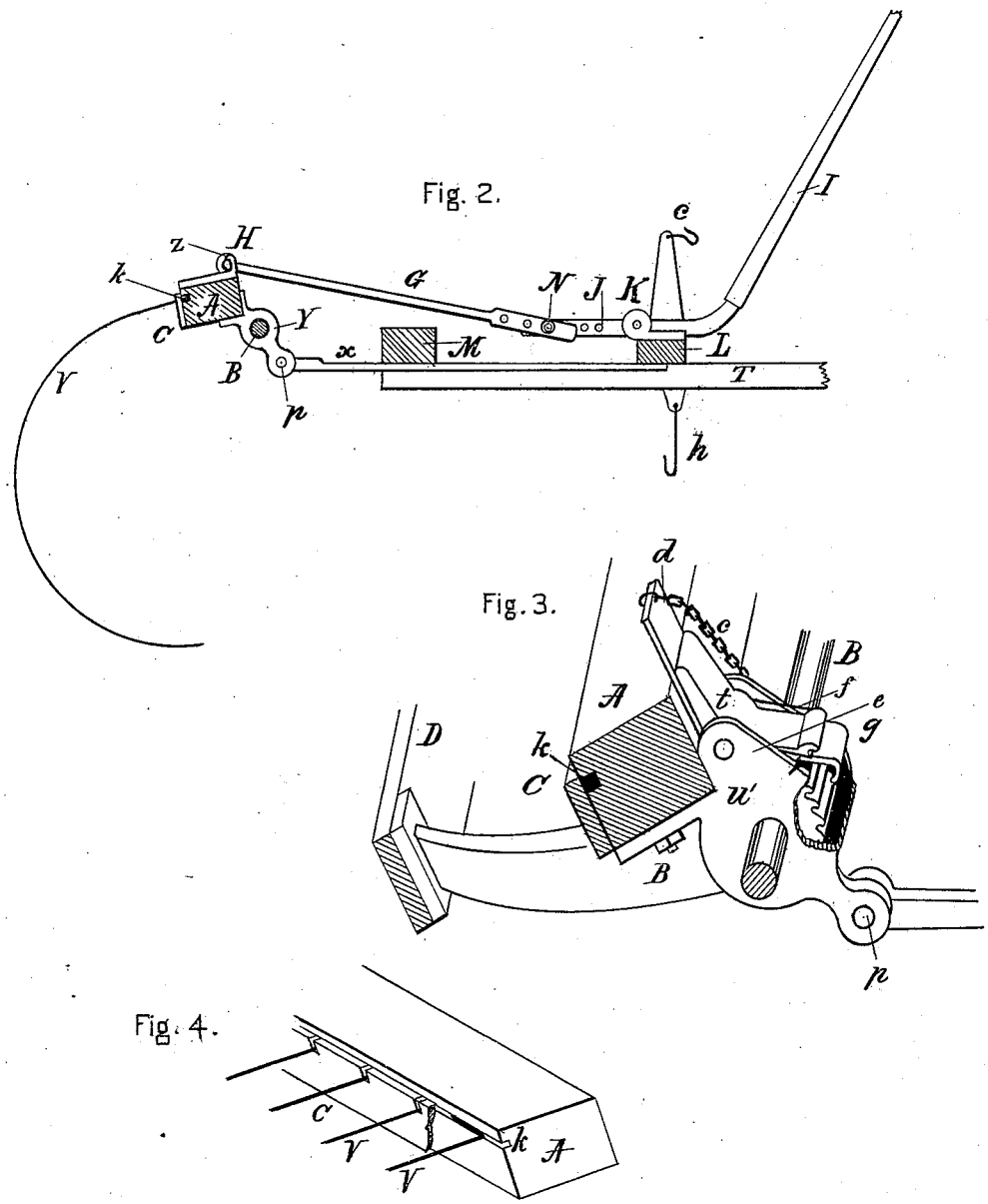
Attest,
Leonard Vassall
Arthur LeBoutillier
Inventor,
William H. Hall
By Parkinson & Parkinson
His attorneys (No Model.)

W. H. HALL.
HORSE RAKE.

No. 333,218.   Patented Dec. 29, 1885.

Attest,
Leonard Vassall
Arthur LeBoutillier.

Inventor,
William H. Hall
By Parkinson & Parkinson
His attorneys

UNITED STATES PATENT OFFICE.

WILLIAM H. HALL, OF TIFFIN, OHIO.

HORSE-RAKE.

SPECIFICATION forming part of Letters Patent No. 333,218, dated December 29, 1885.

Application filed March 24, 1885. Serial No. 160,019. (No model.)

*To all whom it may concern:*

Be it known that I, WILLIAM H. HALL, a citizen of the United States, residing at Tiffin, in the county of Seneca and State of Ohio, have invented certain new and useful Improvements in Horse-Rakes, of which the following is a specification.

My invention relates, first, to the construction of the frame and the mode of mounting the rake and frame; second, to the mode of attaching the teeth to the rake-head; third, to the construction of the cleaner and a provision for causing it to ride freely over the teeth; fourth, to the construction of the ratchet by which the dumping is effected through the power communicated by the revolving axle; and, fifth, to the construction of other special features of the rake.

Figure 1:
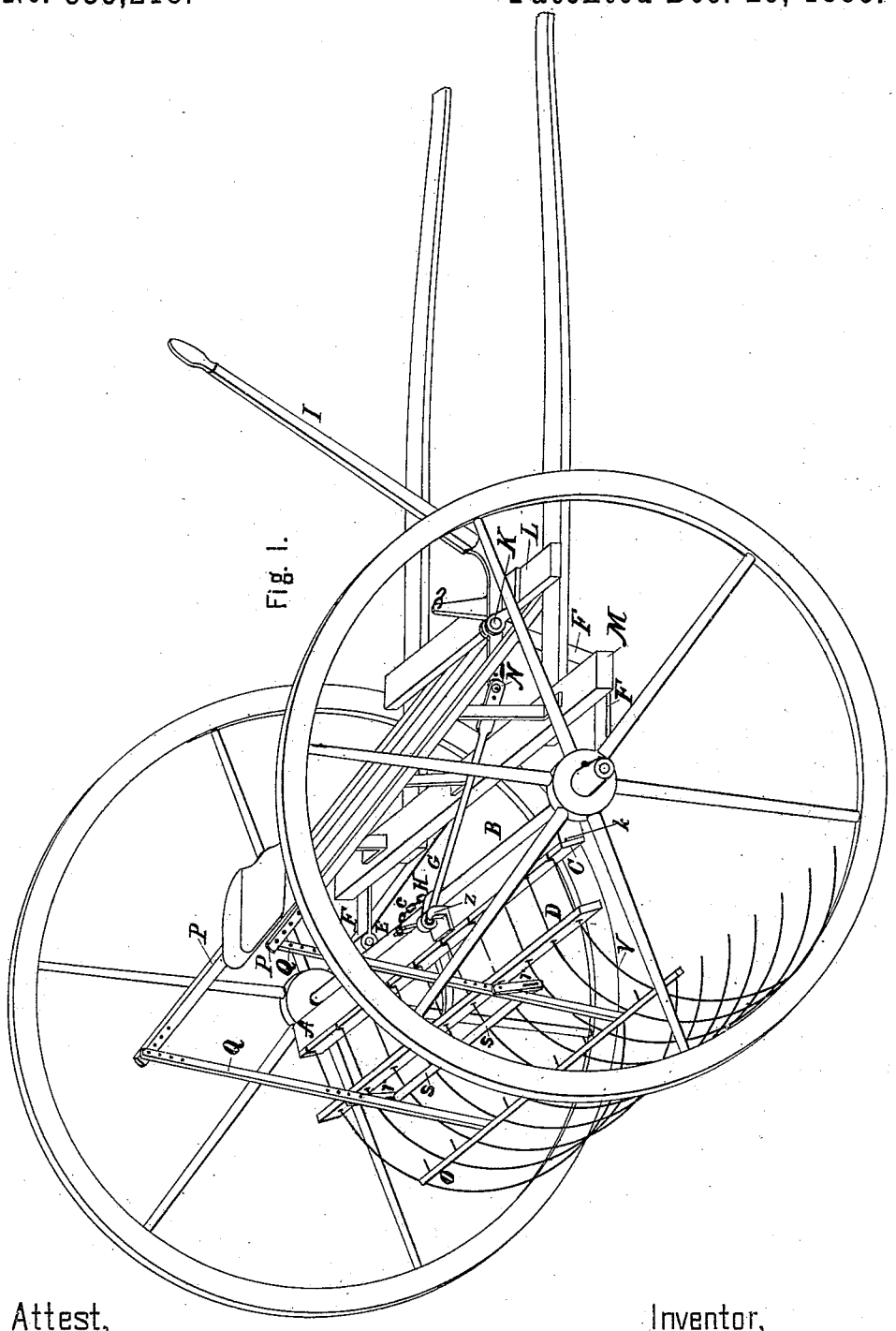
Figure 5:
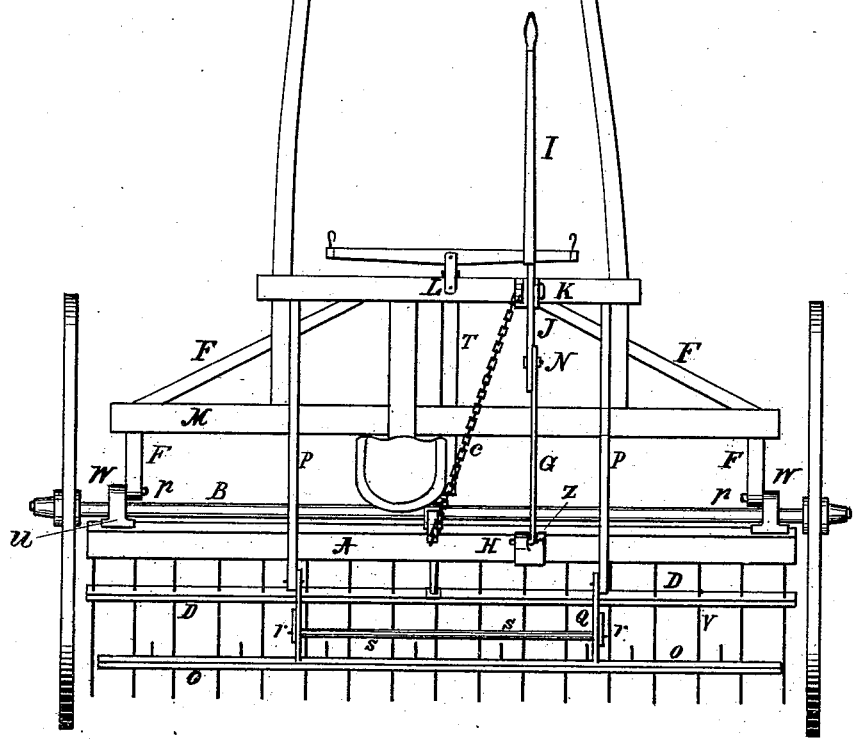

In the drawings, Figure 1 is a perspective of my rake; Fig. 2, a cross-section through the rake-head at the point of attachment of the hand-lever, showing a side view of this lever and of the hook to which the dumping-chain is attached and the hook for locking the hand-lever when transporting the rake, respectively; Fig. 3, a cross-section through the rake-head near the center, showing a side view of the dumping-ratchet; Fig. 4, a detailed view of a portion of the rake-head with the end of the tooth cap-board broken away, also a perspective of a tooth removed from the rake-head; and Fig. 5 a plan view of a portion of the rake and thill-frame.

The thill-frame is formed by connecting the thills by the two cross-girths L and M, and connecting these girths at the center by a short girth, T, to which the whiffletree is attached. The draw-irons F, which have loops at their rear ends, by which they are attached to the side brackets, W, are carried forward to the rear girth, to which they are firmly secured, then being bent so as to extend forward and inward, projecting across the shafts, to which they are also secured, and thence extend to the forward girth, to which they are attached at a point between the thills. The center draw-iron, *x*, having at its rear end a loop by which it is connected to the center bracket, is attached to the center girth. These draw-irons serve to firmly brace together the thill-frame, as well as to connect it to the brackets. The end brackets, W, (fully shown in Fig. 5,) have bearings Y, through which the axle passes, upper flanges, U, by which they are secured to the rake-head, and lugs or pins P, projecting from them for the reception of the loops of the draw-irons. The ratchet-casing at the center of the rake having a flange connecting it with the rake-head, a bearing for the axle, and a forward projection, with a similar lug or pin to receive the loop of the center draw-iron, is made to serve the purpose of a center bracket. These brackets not only furnish a convenient means of uniting the rake-head and axle to the thill-frame, but overcome one of the serious objections to the class of rakes that are dumped by means of a ratchet—namely, that they are too heavy behind. The forward frame or thill-frame being pivoted on the brackets at a point in front of the axle, the weight of that frame and of the driver acts as a weighted lever to counteract the weight of the rake. This leverage can be increased by extending the pivotal points, or, in other words, the bracket-lugs, farther forward. When the rake is to be mounted or unmounted, only one end bracket need be removed. The loops of the draft-irons at the center and opposite end can then be readily slid on or off their respective pins. The mounting is completed by placing in position the end bracket which has been removed. It will lock the parts together at all three bearings.

Instead of making the pins on the brackets, they may be placed on the draft-irons and the brackets provided with loops or bearings to receive them. This would be an immaterial variation. The ear H on the top of the rake-head receives the lever connecting-rod G. At one side of the front of this ear is a lug, *z*. The rod G is first hooked into the ear H and then turned forward and attached at its front end by a pin or other suitable pivot, N, to the hand-lever I, which is in turn pivoted in the ear K. When the rod G is in this position, the the lug *z* locks it in the ear H. When the rake is to be transported, the teeth can be lifted by means of the hand-lever and the hook *h* placed over the rear arm of this lever. This will lock the teeth in their elevated position. A series of pivot-holes in the front end of rod G enable an adjustment within any range that may be desired. The rake-head has a rabbet or slot, $k$, extending lengthwise of it, and a tooth cap-board. C, slotted at its upper edge to receive the teeth. The teeth have at their front ends lateral projections, substantially at right angles, adapted to fit into the rabbet. This lateral projection is shown in the tooth exhibited in full in Fig. 4. By simply placing the teeth in their respective slots in the cap-board, and then attaching this cap-board to the rake-head, the teeth are firmly secured in place. They can all be readily removed by unfastening the cap-board. Posts P, projecting from the front of the frame, afford pivotal supports for the rods Q, which support the cleaner-bar O. To these rods is attached the roller $s$. The mode of attaching this roller preferred by me is to place its journals in the slotted ears $r$, which ears are pivoted in the rods Q, and may be turned on their pivot so as to support the roller either below or above these rods, according as it may be desired to have the cleaner-bar lifted from the teeth at an earlier or later stage of the dumping, and can, by means of perforations in that rod, be adjusted up or down. Instead of these ears, plain ears may be riveted or in any way attached to the supporting-rods, or the supporting-rods may be bent over and perforated to receive the journals of the roller.

Instead of a continuous roller extending crosswise of the rake, a sectional roller may be used, or separate rollers for each tooth; or some of the advantages may be obtained without providing for the rotation of the bar $s$; but where this bar does not rotate it will be more liable to be worn in grooves by the friction of the teeth. Overhung cleaners are apt to give trouble by reason of not moving freely over the curve of the teeth. It will be seen that as the teeth are lifted in my rake the roller comes in contact with them, causing the cleaner to ride freely over them, and lifting the cleaner-bar sufficiently to allow any whisps of hay that may cling to the teeth to fall out. Perforations or pins may be provided in the supporting-rods and corresponding pins or perforations in the posts P to allow for adjustment of the supporting-rods up or down or to different inclinations. The ratchet-casing U' has an arm which reaches back and is attached to the tooth guide-board D, while it is projected in front and beneath to form the center bearing for the front frame, as before described. The ratchet-latch is hung in front of the head in ears $e$, and is provided with the spring $f$, which serves to hold it out of engagement. To this latch is attached the chain $c$, which is hooked or otherwise attached sufficiently far forward to enable the driver to readily depress it with his foot, thus throwing the ratchet into engagement and causing the dumping of the rake. Instead of this chain, any convenient rod or lever attachment may be used. The axle is connected with the wheels by suitable pawls, so as to revolve as the rake advances. This revolution may be imparted to it in any of the methods used in rakes that are dumped by the revolving axle.

I claim as my invention—

1. In combination with the overhung cleaner of a rake, a rod or supplemental support hung upon the cleaner-rods in front of the cleaner-bar and above the teeth, whereby, through the impact of the teeth against said rod, the cleaner-bar is lifted from the teeth when the rake is dumped.

2. In combination with a rake, an overhung cleaner having pivoted thereto in advance of the tooth-bar of said cleaner a roller whereby the cleaner-rod is lifted from the teeth when the rake is dumped.

3. In combination with a rake, a cleaner-bar supported in swinging rods, to which is pivotally attached above the teeth and at a point in advance of said cleaner-bar a roller adapted to move over the curve of the teeth when raised or lowered.

4. In combination with the cleaner-bar of a rake, the supporting-rods, the ears pivotally attached thereto, and the roller journaled in said ears.

5. In combination with the rods supporting the cleaner-bar of a rake, the slotted ears pivoted thereto and supporting the roller, and the roller serving to raise the cleaner-bar when the rake is dumped, substantially as described.

6. In combination with the rake-head and the center draw-iron, the ratchet-casing having a forward projection pivotally supporting the center draw-iron.

7. In combination with the rake-head and the center draw-iron, the ratchet-casing directly attached to the rake-head having projecting in the rear thereof an arm attached to the tooth guide-board and a forward extension affording a pivotal support to the center draw-iron.

8. The combination, with the rake-head and ratchet-wheel, of the ratchet-casing mounted on the front of said rake-head and having pivoted therein at a point in front of said rake-head, a ratchet-latch overhanging the ratchet-wheel, so as to engage the same in front of its axis, the said latch being held normally out of engagement by means of a spring, and provided with an extension above its pivot constituting one arm of a lever, of which the latch is the opposite arm and the pivot the fulcrum, to which upward extension is connected a rod or chain which serves to rock said latch on its fulcrum and thereby throw it into engagement.

WILLIAM H. HALL.

Witnesses:
 ROBERT LYSLE,
 J. W. GEIGOR.